B. E. LEAS.
RESILIENT TIRE.
APPLICATION FILED NOV. 19, 1912.
1,086,923.
Patented Feb. 10, 1914.
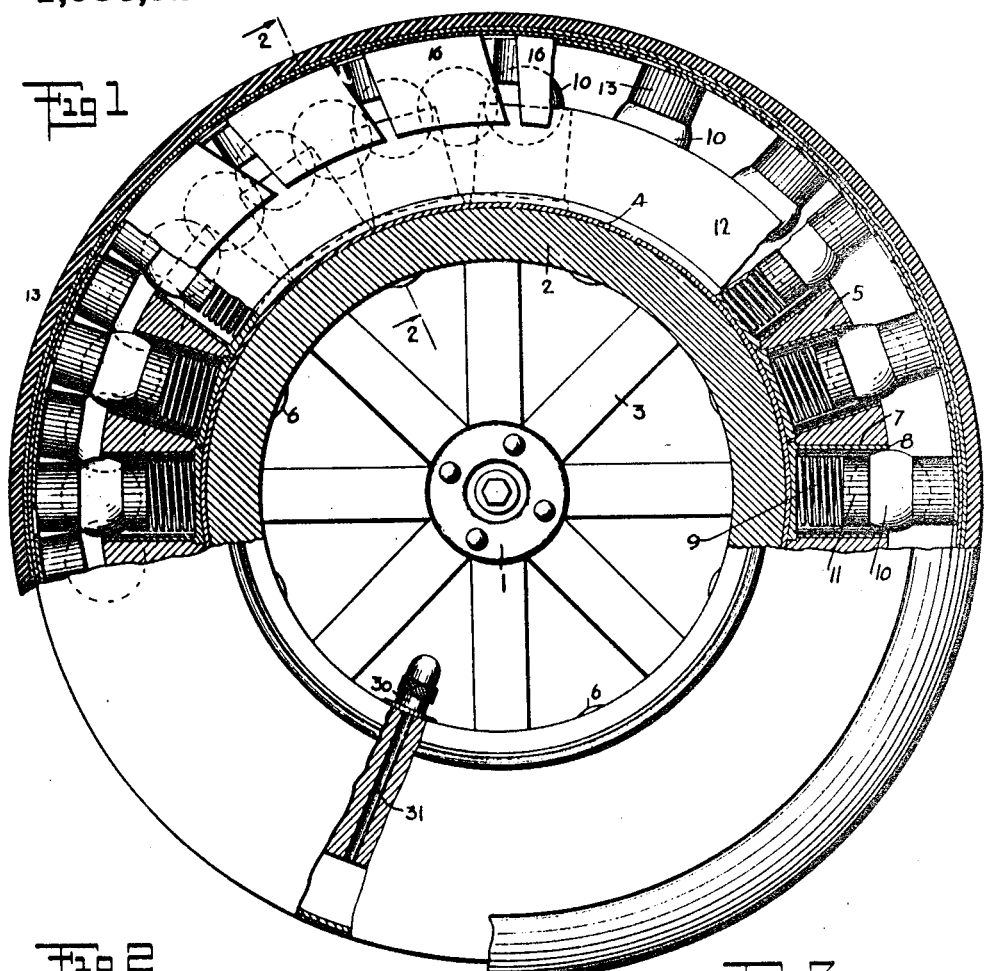
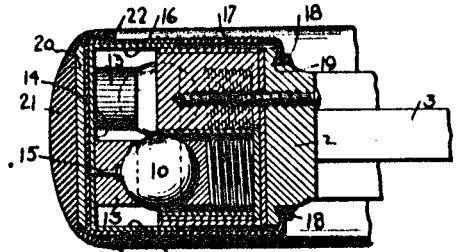
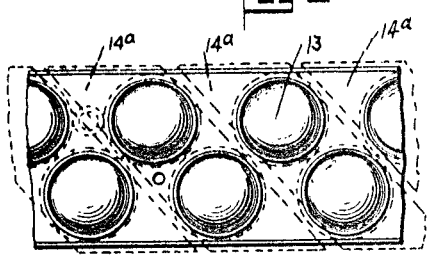
WITNESSES
INVENTOR
BERT E. LEAS,
BY
ATTORNEYS

UNITED STATES PATENT OFFICE.

BERT ELLWOOD LEAS, OF LUVERNE, MINNESOTA.

RESILIENT TIRE.

1,086,923.  Specification of Letters Patent.  Patented Feb. 10, 1914.

Application filed November 19, 1912. Serial No. 732,236.

*To all whom it may concern:*

Be it known that I, BERT E. LEAS, a citizen of the United States, and a resident of Luverne, in the county of Rock and State of Minnesota, have invented a new and Improved Resilient Tire, of which the following is a full, clear, and exact description.

This invention relates generally to resilient tires, and more particularly is directed to a structure characterized by a number of ball bearings between the tread portion and the felly.

The principal object of the invention is the provision of a resilient wheel of new and improved construction, wherein the tread is movable relatively to the felly through the medium of ball bearings and springs, such parts being permanently inclosed, whereby they are kept free from the entrance of dust and foreign matter, the arrangement also providing for maintaining the bearings in a constant state of lubrication.

Reference is to be had to the accompanying drawings forming a part of this specification, in which like characters of reference indicate corresponding parts in all the views, and in which—

Figure 1 is a side view, partly sectional, of the wheel; Fig. 2 is a sectional view thereof on the line 2—2 of Fig. 1; while Fig. 3 is a partial plan view of the under side of the member carrying the cups which position the balls.

As shown particularly in Fig. 1, the wheel comprises the hub 1 and an inner rim or felly 2, together with a number of spokes 3, the sizes of which parts are immaterial. Adjacent the said inner rim or felly 2 is a metallic band 4 extending there-around, an outer rim or felly 5 being positioned on top of the band and concentric with the inner rim, these parts being held together by means of screws or bolts 6.

The outer rim is provided with a number of openings 7 of suitable depth, adapted to receive the cups 8 containing helical springs 9 therein; the cups are adapted to receive steel balls 10, a number of elements 11 being positioned between the balls and the springs and forming pockets suitably recessed to receive portions of the balls. Referring particularly to Figs. 2 and 3, it will be noted that these balls and the openings 7 receiving them are staggered, that is, those adjacent one edge portion of the rim lie intermediate those adjacent the other edge portion. Fixed to the side portions of the said outer rim or felly 5 are annular rings 12. Referring particularly to Fig. 2, it will be noted that a number of cup bearings 13 are provided which coöperate with the said balls 10, the said bearings receiving the balls and being suitably recessed as shown; these bearings are carried by a channel iron 14, being secured thereto in any suitable manner, as by means of bolts or rivets 15, the channel iron being concentric with the felly, the sides 16 extending downwardly along the outer side of the said rings 12, whereby movement of the parts is guided as the wheel rolls over the ground, the said springs 9 being compressed more or less, depending on the nature of the road. Extending along the outside of the said channel iron, and completely inclosing the outer rim or felly, is an envelop 17, having wires 18 securely fixed thereto, as by means of vulcanizing, the lengths of the sides of the said envelop being such that this element is maintained in position by means of circular pockets 19 provided on the inner rim 2, the wires 18 keeping the edge portions of the sides in the pockets. Such construction provides for always maintaining the cups and balls and springs inclosed and preventing access of dust and foreign matter, the flexible nature of the said envelop being such that relative movement of the parts is permitted. On top of the said envelop, and extending around the periphery of the wheel, is a protecting band 20, preferably of metal; on top of this band is the tread 21, preferably of rubber or similar material, of greatest thickness along its central axis, opposite edge portions of the tread extending around the said envelop 17 and being maintained in position by means of wires 22 positioned adjacent the edges of the tread. Referring particularly to Fig. 3, it will be noted that the said channel iron 14 is made of a number of elements 14$^a$, the construction being such that any single element extends diagonally across the wheel, whereby the provision of two cup bearings in staggered relation is taken care of as described.

The wheel presents an efficient structure, and one which is designed to make for smooth riding, and is assembled in substantially the following manner:—After the hub, spokes and inner rim have been assembled, the band 4 is placed around the said rim, the outer rim 5 being then placed in position, after which these parts are held together by means of the said screws or bolts 6. The rings 12 carried at the sides of the outer rim may be held in position in any suitable manner, and, if desired, may be provided with flanges adapted to be entered between the outer and inner rims, in which event the steel band 4 will be of less width than shown. The cups 8 may then be entered into the openings in the outer rim, or these cups may be so made that they are entered into the openings before the outer rim has been assembled; in any event the springs are entered into the cups, the recessed elements 11 being then positioned, and, finally, the balls 10; the balls and recessed elements may be maintained within the cups and the springs compressed while the envelop 17, with the channeled elements 14ª secured thereto, are being positioned around the wheel, any suitable tool or device being used for this purpose, the balls entering the cup bearings after removal of the said tool or device, thereby permitting the envelop to be fixed in position by means of the wires entering the pockets in the inner rim, as described. Finally, the band 20 is positioned around the top of the envelop, or the band may be brought to such position before removing the said tools or devices, the tread being finally positioned on the band, after which the parts of the wheel are in operative relation one to the other.

Due to the fact that when the wheel is in use considerable movement of the balls within the cups and bearings will occur, provision is made for lubrication of the said balls, cups and bearings, the envelop 17 preventing access of dust or material to these parts, and also preventing the escape of lubrication when the parts are assembled. The cups are filled with grease, which will last for considerable time, the renewal being taken care of through the provision of a removable cap 30 carried adjacent the inner rim 2, and serving to close the passageway 31 extending through the outer rim and communicating with the open space adjacent the cup bearings.

The wheel described is especially adapted for automobile use and does away with pneumatic tires, thereby making for low operating cost since the resilient feature is provided by the said springs and the tread; the tread is of simple construction and is easily replaceable at a low price.

Having thus described my invention, what I claim as new and desire to secure by Letters Patent is:—

1. The combination with the felly of a wheel, of an outer felly provided with a plurality of pockets, a channel iron concentric with the outer felly, a plurality of inwardly projecting cups on the inner face of said channel iron, recessed bearings in the pockets of the outer felly, springs interposed between the bearings and the bottoms of the pockets, balls in the pockets and the cups and in engagement with the bearings, and an envelop extending over the channel iron down the sides of the same and over the outer felly and secured to the felly of the wheel.

2. The combination with the felly of a wheel, of an outer felly provided with pockets, a channel iron formed of a plurality of sections and into which the outer felly projects, a plurality of cups on each section of the channel iron, bearings in the pockets of the outer felly, springs interposed between the bearings and the bottoms of the pockets, balls in the cups and pockets and in engagement with the said bearings, and an envelop extending over the channel iron and down over the outer felly and secured to the felly of the wheel.

3. The combination with the felly of a wheel, and a band thereon, of an outer felly provided with rows of openings, the openings being arranged in staggered relation, cups in the openings, a channel iron formed of sections extending diagonally across the wheel, each section being provided with two cups, springs in the cup of the felly, bearings on the springs, balls on the bearings and projecting into the cups of the channel iron, and an envelop extending over the channel iron down and over the outer felly and secured to the felly of the wheel.

In testimony whereof I have signed my name to this specification in the presence of two subscribing witnesses.

BERT ELLWOOD LEAS.

Witnesses:
A. D. La Duc,
E. A. Hilke.

Copies of this patent may be obtained for five cents each, by addressing the "Commissioner of Patents. Washington, D. C."